United States Patent [19]
Khuri-Yakub et al.

[11] Patent Number: 4,909,082
[45] Date of Patent: Mar. 20, 1990

[54] ACOUSTIC TRANSDUCER FOR ACOUSTIC MICROSCOPY

[75] Inventors: Butrus T. Khuri-Yakub; Ching H. Chou, both of Palo Alto, Calif.

[73] Assignee: The Board of Trustees of the Leland Stanford Junior University, Stanford, Calif.

[21] Appl. No.: 281,941

[22] Filed: Dec. 6, 1988

Related U.S. Application Data

[63] Continuation of Ser. No. 9,468, Feb. 2, 1987, abandoned.

[51] Int. Cl.[4] ............................................. G01N 29/04
[52] U.S. Cl. ........................................ 73/642; 310/335
[58] Field of Search ................. 310/395, 396; 73/606, 73/642

[56] References Cited

U.S. PATENT DOCUMENTS

| | | | |
|---|---|---|---|
| 3,911,729 | 10/1975 | Collins | 73/603 |
| 4,012,951 | 3/1977 | Kessler | 73/603 |
| 4,509,360 | 4/1985 | Erwin et al. | 73/642 |
| 4,550,609 | 11/1985 | Johnson | 73/642 |

Primary Examiner—Jerry W. Myracle
Attorney, Agent, or Firm—Flehr, Hohbach, Test, Albritton & Herbert

[57] ABSTRACT

A shear acoustic transducer-lens system in which a shear polarized piezoelectric material excites shear polarized waves at one end of a buffer rod having a lens at the other end which excites longitudinal waves in a coupling medium by mode conversion at selected locations on the lens.

4 Claims, 3 Drawing Sheets

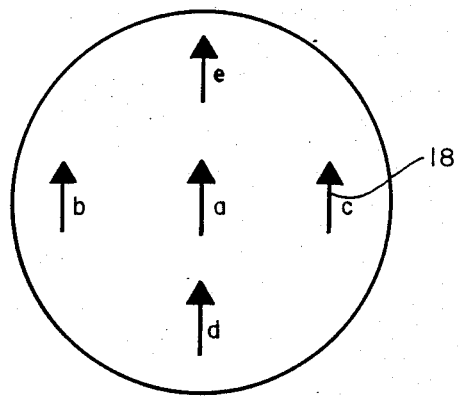
FIG.—5
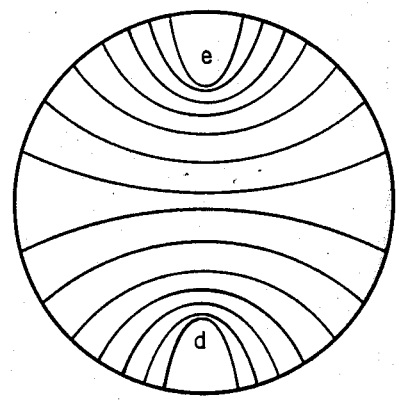
FIG.—6
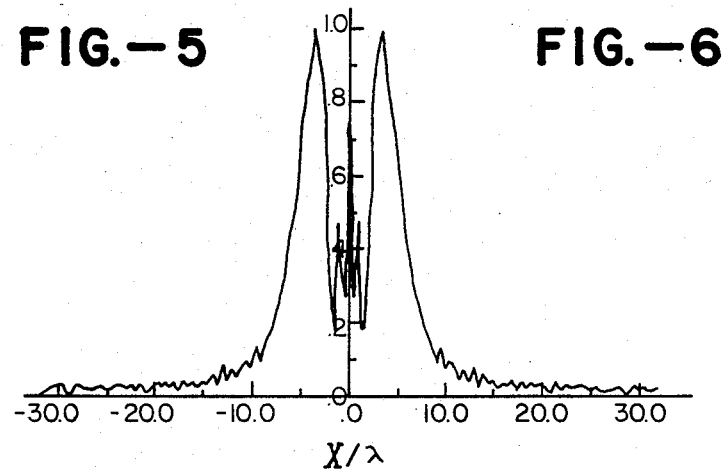
FIG.—8
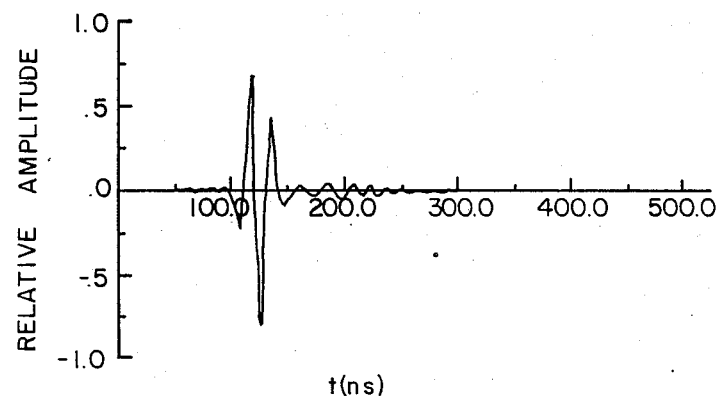
FIG.—9

ACOUSTIC TRANSDUCER FOR ACOUSTIC MICROSCOPY

This invention was made with Government support under No. DE-FG03-84ER45157 awarded by the Department of Energy. The Government has certain rights in this invention.

This is a continuation division, of application Ser. No. 009,468 filed Feb. 2, 1987, now abandoned.

This invention relates generally to acoustic transducer-lens systems for use in acoustic microscopes and more particularly to a shear acoustic transducer-lens system.

The conventional transducer-lens systems have been a longitudinal acoustic transducer-lens system. These systems have included a layer of longitudinally polarized piezoelectric material attached to or deposited on one end of a buffer rod with a spherical lens formed at the other end of the buffer rod. Spherical lenses work very well for imaging applications and material characterizations.

A typical prior art longitudinal transducer-lens system is shown in FIG. 1. For surface imaging applications, the acoustic longitudinal waves generated by the longitudinal transducer propagate through the buffer rod and are focused at the surface of the sample by the lens. In order to obtain a low sidelobe level, the buffer rod length is chosen to correspond to S=1 where $$S = \lambda l / a^2$$

where $\lambda$ is the wavelength of the longitudinal wave in the buffer rod and $l$ is the length of the buffer rod and $a$ is the radius of the transducer.

Bringing the lens closer to the sample (defocusing) induces surface acoustic waves which give quantitative information about the material properties such as surface wave velocity and residual stress. It is important to excite surface wave efficiently for material characterization. To evaluate the efficiency of surface wave excitation one looks at the impulse response of the transducer-lens system in the time domain.

FIG. 2 shows the theoretical results of the main impulse response of a longitudinal transducer-lens system with the buffer rod length corresponding to S=1 at the center frequency of 50 MHz when defocused $-1.8$ mm. The diameter of the lens is 4.5 mm and the F-number is 1.65. The sample for which the calculations were made was hot pressed silicon nitride. It is clear that the received signal consists of a specularly-reflected signal which comes first and a surface-wave component which arrives second and that the surface-wave signal is weaker than the specularly-reflected signal.

In order to increase the relative amplitude of the surface wave signal, it is helpful to minimize the acoustic illumination at the center region of the lens. One way of doing this is to place the lens in the near-field of the transducer, at a location where the on-axis field strength is at a minimum such as for S=0.5.

FIG. 3 shows the theoretical results for time domain impulse response of a longitudinal transducer-lens system constructed with a buffer length corresponding to S=0.6 at a center frequency of 40 MHz and a focusing distance of $-1.8$ mm. The lens diameter is 3.5 mm and the F number is 1.65. The sample is hot pressed silicon nitride. Surface wave excitation efficiency with respect to the specular reflection has been increased compared to that of the transducer-lens system of FIG. 2.

In another class of problems, it is desired to measure the anisotropy in anisotropic samples by using acoustic metrology. In these applications the use of a spherically focused, uniformly illuminated transducer is not desired because it averages anisotropy of the material around an axis normal to the surface of the sample. For this application, cylindrical lenses are preferred to spherical lenses because the anisotropy can be measured accurately but at an expense: loss in spacial resolution. Cylindrical lenses are typically sharply focused in one direction and unfocused in the other direction. Thus, the focal spot is very long and thin along the axis of the cylindrical lens.

It is a general object of the present invention to provide a shear acoustic transducer-lens system.

It is another object of the present invention to provide a transducer-lens system in which longitudinally polarized waves are induced in the coupling medium.

It is a further object of the present invention to provide a transducer system in which a shear polarized piezoelectric material excites shear polarized waves at one end of a buffer rod having a lens at the other end which excites longitudinal waves in a coupling medium by mode conversion at selected locations on the lens.

The foregoing and other objects of the invention are achieved by an acoustic transducer-lens system which includes a buffer rod, a shear polarized piezoelectric material coupled to one end of said rod and a lens formed at the other end of said rod to excite longitudinal waves in a coupling medium.

The foregoing and other objects will be more clearly understood from the following description taken in conjunction with the following drawing.

FIG. 5 is a schematic view showing the shear waves at the lens within the buffer rod.

FIG. 6 is a schematic view showing the coupling at the face of a spherical lens excited by the shear waves of FIG. 5.

FIG. 8 shows the acoustic field distribution along the direction of polarization in a plane at 0.3 mm defocus, for a linearly-polarized shear transducer lens system.

FIG. 9 shows the impulse response of the radially polarized shear transducer-lens system.

Figure 1:
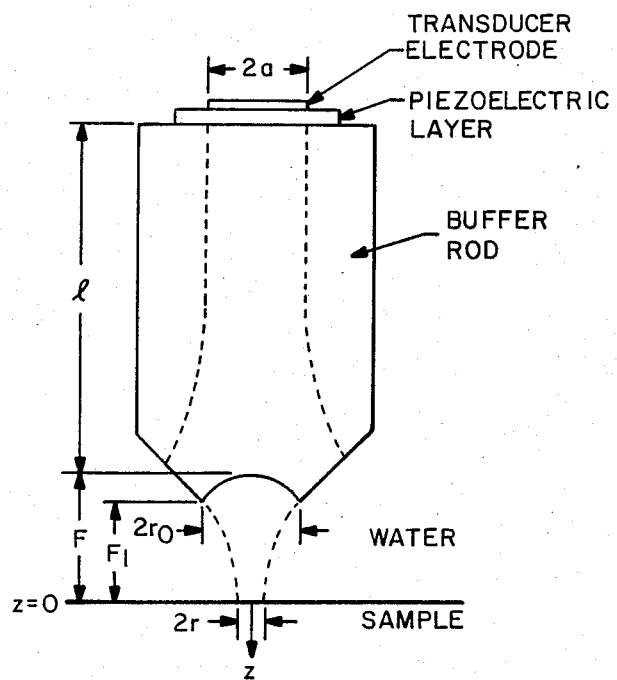
FIG. 1 is a schematic diagram of a typical prior art longitudinally polarized transducer-lens system.
Figure 2:
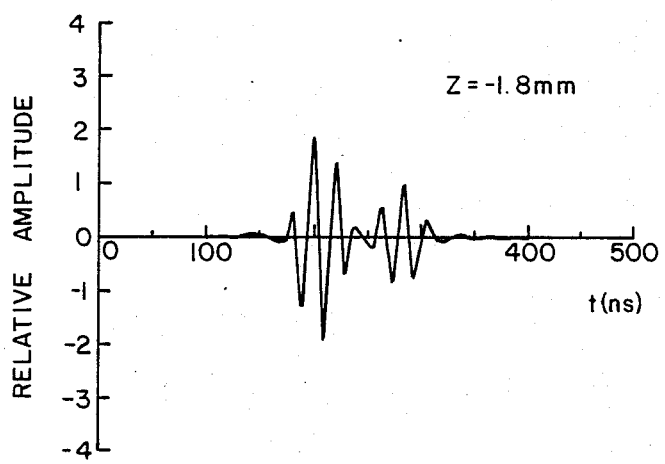
FIG. 2 shows the impulse response of the lens system of FIG. 1.
Figure 3:
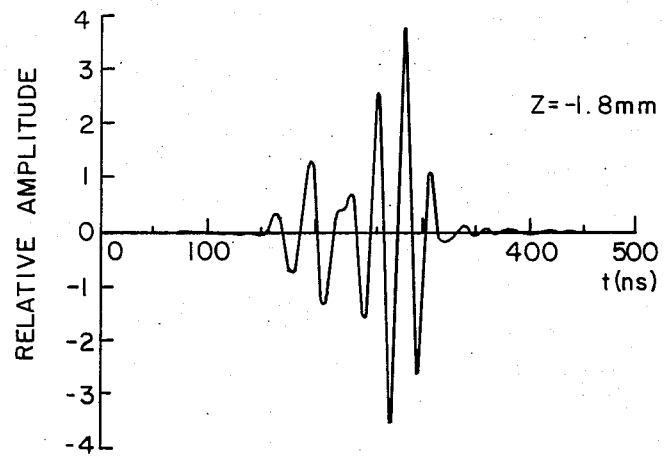
FIG. 3 shows the impulse response of the lens system of FIG. 1 with the acoustic illumination at the center of the lens minimized.
Figures 4, 7:
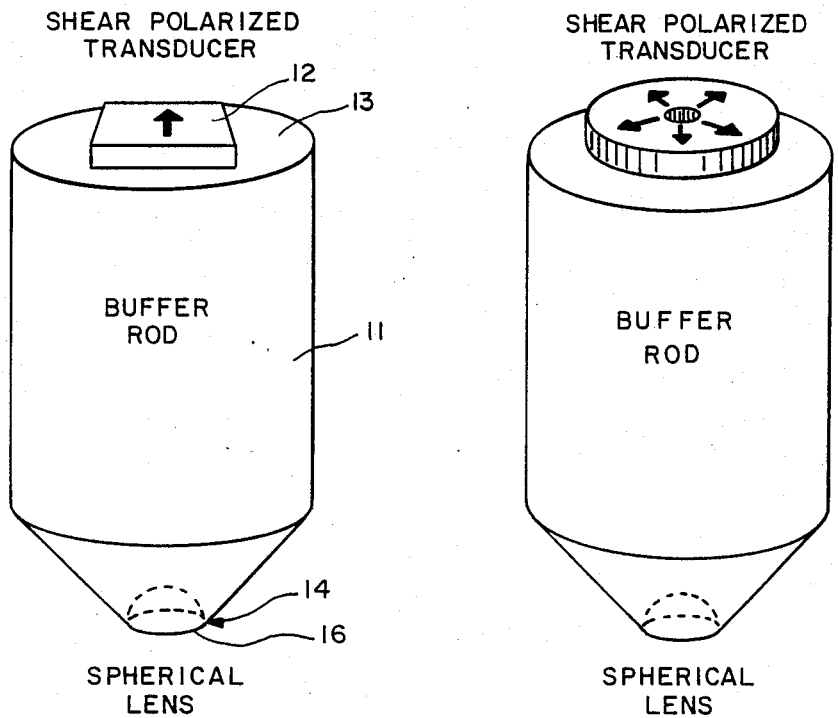
FIG. 4 shows a linearly shear polarized transducer system in accordance with the one embodiment of the present invention.
FIG. 7 shows a radially shear polarized acoustic transducer in accordance with another embodiment of the invention.

FIG. 4 shows a shear-polarized transducer lens system in accordance with one embodiment of the invention. The system shown includes a buffer rod 11 of quartz, sapphire or silicon, a shear polarized piezoelectric material 12 deposited or suitably attached to one end 13 of the buffer rod. The opposite end 14 of the buffer rod is ground or otherwise formed into a spherical lens 16. Application of voltage across said shear polarized piezoelectric material excites shear polarized waves in the buffer rod as shown by the arrow, which travel downwardly to the lens. The lens is illuminated by the shear polarized acoustic waves 18, FIG. 5. Mode conversion at the buffer rod coupling medium interface excites longitudinal waves in the coupling mediums, usually water, as shown schematically in FIG. 6. Mode conversion will only couple longitudinal waves into the coupling medium at selected locations of the lens. At point "a" no mode conversion takes place because of the normal incidence of the shear wave at the interface. At locations "b" and "c" no longitudinal waves are mode converted because the shear wave is incident on the interface as a shear horizontal polarized wave which couples no energy into longitudinal waves in the coupling medium, and is wholly reflected inside the buffer rod. However, at locations "d" and "e" the shear wave is incident as a shear vertical polarized wave and couples energy into the coupling medium. Thus as shown schematically in FIG. 6, the pattern of excitation of longitudinal waves in the coupling medium is directional in that the energy is excited preferentially along one axis(in the direction of the shear polarization) and is totally absent along the orthogonal axis. With such a transducer-lens combination there is a focal spot with spacial resolution determined by the spherical lens and unidirectionally given by the mode conversion from shear into longitudinal waves at the buffer rod coupling medium interface. With such a lens it is possible to measure anisotropy with a much better spacial resolution than is presently available with a cylindrical lens.

The deposited piezoelectric film may be a film such as zinc oxide with shear polarization and capable of operating at frequencies in the tens of gigahertz range. Thus the method is not restricted to low frequencies but can also be used at any frequency of operation where acoustic microscopes are being made.

Another configuration of a transducer lens system is shown in FIG. 7. The configuration of the piezoelectric material is one which provides radial shear polarized waves shown by the radial arrows in the buffer rod by application of a voltage to the transducer. With such a lens illumination, there are no longitudinal waves converted in the water at the center of the lens. Away from the center of the lens more energy is coupled into the coupling medium by mode conversion. This is because the incidence angle at different locations of the interface vary, with r/F where r is the radial distance from the center of lens and F is the focal length of the lens. If this transducer-lens system is used to measure a sample we find that as the transducer is brought closer to the sample, surface acoustic waves are excited and specular reflections from the sample are very weak and almost nonexistent. With such a transducer acoustic microscopy measurements of surface wave velocity changes with spacial resolution corresponding to a few wavelength of the longitudinal wave in water may be made. In other words, because there are no normal components in the acoustic beam in the coupling medium, a slight defocus (the lens closer to the sample) allows the excitation of surface waves. This excitation is shown in FIG. 8 where amplitude of the acoustic field as a function of distance in terms of $x/\lambda$ is shown at a focal distance of $-0.3$ mm at $f=50$ mHz. It is seen that the distance between peaks is about 8 wavelengths providing a small spot size on the order of a few wavelengths.

The calculations for such a lens is shown in FIG. 9 for a shear transducer-lens system with the frequency equal to 50 MHz defocused 1.8 mm, the diameter being 2 mm and F number 1.65. The sample is hot pressed silicon nitride. FIG. 9 shows clearly that the specularly reflected signal is negligible compared to the surface wave component. This allows one to obtain a clean surface wave with little defocusing, which is very important for material characterization with high spacial resolution.

To take advantage of the "cleaner" surface wave excitation and anisotropic property of the shear transducer-lens system many novel applications can be expected such as measuring the surface wave velocity, residual stress and anisotropy of materials as well as film thickness and subsurface crack depth with good spacial resolution.

The polarized transducer 12 can be made such that both longitudinal and shear waves are excited in the buffer rod. Thus, both types of waves can be used to analyze a specimen and provide different temporal signals.

Thus there has been provided a shear acoustic transducer-lens system for providing high efficiency surface wave excitation. The novel configuration of the shear transducer-lens systems makes it possible to make quantitative measurements of surface wave velocity variations, anisotropy, residual stress, surface defects with a spacial resolution of a few wavelengths of the longitudinal wave in the coupling medium (water).

I claim:

1. A transducer-lens system for use in an acoustic microscope to excite surface waves in a selected region of a sample immersed in a coupling medium which couples the transducer to the sample comprising a buffer rod, a shear polarized layer of piezoelectric material coupled to one end of said rod, means for applying an electric field to said layer to generate shear acoustic waves which travel into and along the buffer rod and a lens formed by shaping the other end face of said rod, said lens being illuminated by said shear acoustic waves, said lens face being shaped to provide at selected locations on the surface of said lens excitation by mode conversion at the lens-coupling medium interface longitudinal acoustic waves which are focused on the sample by the lens and excite surface waves in the selected sample region.

2. An acoustic transducer-lens system as in claim 1 wherein the lens is symmetrical.

3. An acoustic transducer lens system as in claim 1 wherein the shear polarized layer of piezoelectric material is also longitudinally polarized.

4. A transducer-lens system comprising a buffer rod, a shear radially polarized layer of piezoelectric material coupled to one end of said rod, means for applying an electric field to said layer to generate radially polarized acoustic waves which travel into the buffer rod and a lens formed at the other end of said buffer rod.

* * * * *